350-267

CROSS REFERENCE SEARCH ROOM

X2677
X2532
X2015

June 2, 1964 G. H. BROWN ETAL 3,135,207

METHOD AND APPARATUS FOR DISPLACING DIELECTRIC LIQUIDS

Original Filed July 5, 1955 5 Sheets-Sheet 1

INVENTORS.
Glenn H. Brown.
John F. Dreyer.
Hyman R. Lubowitz.
BY William H. Middendorf.
Wood, Herron & Evans.
ATTORNEYS.

METHOD AND APPARATUS FOR DISPLACING DIELECTRIC LIQUIDS

Original Filed July 5, 1955 5 Sheets-Sheet 2

INVENTORS.
Glenn H. Brown.
John F. Dreyer.
Hyman R. Lubowitz.
BY William H. Middendorf.
Wood, Herron & Evans.
ATTORNEYS.

METHOD AND APPARATUS FOR DISPLACING DIELECTRIC LIQUIDS

Original Filed July 5, 1955

5 Sheets-Sheet 3

INVENTORS.
Glenn H. Brown.
John F. Dreyer.
Hyman R. Lubowitz.
BY William H. H. Middendorf.
Wood, Herron & Evans.
ATTORNEYS.

METHOD AND APPARATUS FOR DISPLACING DIELECTRIC LIQUIDS

Original Filed July 5, 1955 5 Sheets-Sheet 4

INVENTORS.
Glenn H. Brown.
John F. Dreyer.
Hyman R. Lubowitz.
BY William H. Middendorf.
Wood, Herron & Evans.
ATTORNEYS.

METHOD AND APPARATUS FOR DISPLACING DIELECTRIC LIQUIDS

Original Filed July 5, 1955 5 Sheets-Sheet 5

INVENTORS.
Glenn H. Brown.
John F. Dreyer.
Hyman R. Lubowitz.
BY William H. Middendorf.
Wood, Herron & Evans.
ATTORNEYS.

3,135,207

METHOD AND APPARATUS FOR DISPLACING DIELECTRIC LIQUIDS

Glenn H. Brown, Kent, and John F. Dreyer, Cincinnati, Ohio, Hyman R. Lubowitz, Pasadena, Calif., and William H. Middendorf, Covington, Ky., assignors to University of Cincinnati Research Foundation, a nonprofit corporation of Ohio Original application July 5, 1955, Ser. No. 519,788. Divided and this application July 19, 1961, Ser. No. 127,442
8 Claims. (Cl. 103—1)

This invention relates to a method of converting electrical energy into kinetic and/or potential energy and to transducers for effecting the method. The invention is predicated upon the discovery that an electrical field tends to physically displace a dielectric liquid which is disposed in said field, the direction and degree of displacement depending upon the intensity of the potential gradient of the field and the nature of the dielectric liquid. This application is a divisional application of the copending applcation of Glenn H. Brown, John F. Dreyer, Hyman R. Lubowitz and William H. H. Middendorf entitled "Method and Apparatus for Displacing Dielectric Liquids," Serial No. 519,788 filed July 5, 1955, now abandoned.

We have observed that if two electrodes are contacted with a dielectric liquid with the electrodes narrowly spaced and a relatively intense electrical potential is applied to the electrodes, the dielectric is displaced physically in relation to the electrodes. If the electrodes are partially immersed, the dielectric liquid tends to rise on one electrode or the other or to rise in the space between them, depending upon the identity of the dielectric.

We have further observed that if two screen electrodes are fully immersed in a dielectric liquid, the dielectric flows from one electrode to the other, thus establishing a movement in the dielectric liquid which continues as long as the electrical field is maintained. The direction and rate of displacement depend upon the identity of the dielectric liquid. In general, the dielectric liquids which rise on one electrode more than the other, when the electrodes are partially immersed, have the stronger tendency to flow from one electrode to the other. The dielectric liquids which rise evenly between partially immersed electrodes have little, if any, tendency to flow from one electrode to the other in a manner which produces net displacement of the liquid. However, close observation indicates that the dielectric liquid is in a state of internal motion even if there is no net displacement.

For the purposes of this description of the invention the displacement of dielectric perpendicular to the applied electrical field is termed "transverse displacement" or "cross field displacement." The net displacement of dielectric parallel to the field is termed "colinear displacement" or "cofield displacement."

No contemporary scientific theory explains these phenomena, so it is impossible to say whether the leakage of current through a dielectric liquid is inevitably attended by some displacement of the liquid, however small. No notation of this displacement appears in the pertinent scientific literature, so the present invention may be regarded as based upon a discovery. But the present invention is not predicated merely upon this academic discovery, however novel. The present invention comprehends the determination that the phenomenon is not merely detectable, but that if the dielectric be advantageously chosen and the electrical field advantageously applied to it, the degree and rate of motion of the dielectric is sufficient to be put to highly useful purposes.

The specified conversion of energy may not have been noted in the past because under most conditions which might have occasioned its unobserved occurrence the phenomenon would have been almost undetectable. For instance, if the electrical field were applied by conventional alternating current instead of direct current, no detection would be possible by ordinary instruments, if at all. Also, the conventional dielectrics, such as refined petroleum oil, are less responsive than other available dielectrics which are not used as such in practice, such as acetone. Further, to accomplish a readily detectable conversion of energy, that is, one that can be visually observed without the use of instruments, a relatively intense electrical field must be applied to a relatively responsive dielectric.

For example, if two electrodes, spaced ⅛ inch apart, are immersed in a dielectric such as acetone and a potential of the order of 3000–4000 volts D.C. is applied to the electrodes, then the level of the acetone between the electrodes rises instantaneously and perceptibly perhaps ½ inch or more. This is an example of transverse displacement.

As indicated, the nature of the physical displacement of the dielectric liquid in relation to the electrodes depends upon the identity of the dielecric liquid which is in contact with the electrodes. The formulation of a general rule is not possible on the basis of past observation. As indicated, some dielectrics rise on the positive electrode more than they rise on the negative electrode, some vice versa, and some almost evenly between the electrodes. In many cases minor impurities alter the displacement behavior of the dielectric. So, in advance of exhaustive research, which would require many years, no theory can be devised to predict the behavior of individual dielectrics, chemically pure and otherwise. Therefore, the immediate utilization of the present invention may require the testing of particular dielectrics for specific purposes, but numerous dielectrics are available for providing each type of displacement disclosed herein.

In general, it is believed, upon the basis of experimental evidence now available, that whenever two electrodes are immersed in a dielectric there is always a movement in the cofield direction. This movement may be constituted by streams flowing in opposite directions so that no net colinear displacement occurs; or it may be constituted by a dominant stream flowing in one direction which results in a net cofield displacement. It has been empirically observed that those liquids which exhibit an asymmetric cross field displacement, i.e. a tendency to rise higher on one electrode than the other, also exhibit the greatest cofield displacement flow rate.

However, if the partially immersed electrodes are solid planar electrodes, the colinear displacement is apt to escape detection because the electrodes tend to block the colinear displacement. If, on the other hand, ring electrodes or wire mesh electrodes are mounted in a conduit which is filled with dielectric liquid having the asymmetric transverse displacement response, the application of a direct current potential to the electrodes initiates a unidirectional flow of dielectric from one electrode to the other, the flow continuing as long as the potential is maintained.

The rate of flow for any given dielectric depends upon the potential gradient across the electrodes, and consequently, for any given electrode spacing, varies with the potential imposed upon the electrodes. Thus, the immersed electrodes may be utilized to create a steady displacement, a pulsating displacement, or a displacement first in one direction and then the other if change of polarity is not too frequent to prevent physical response of the dielectric, which may require a fraction of a second, depending upon the factors which determine the responsiveness of the dielectric, including its viscosity.

One extremely useful device utilizing the colinear flow property of a dielectric comprises a series of pairs of electrodes mounted in a conduit to pump a dielectric liquid therethrough. In this case the electrodes of a given pair are relatively narrowly spaced, ⅛ inch for instance, with the pairs spaced a greater distance apart, 3 inches for instance. A high potential is applied across the electrodes of each pair, the direction of potential rise across each pair of electrodes being the same. While the facing electrodes of adjacent pairs provide a field which tends to establish a counterflow of liquid in the conduit, the potential gradient of the field is less than the potential gradient of the closely spaced electrodes and hence only offsets the dominant flow to a minor degree. Also, the response of the dielectric liquid to the field is non-linear in respect to the potential gradient, i.e. increase of potential gradient by 100% increases flow by more than 100%. Hence, the relatively weak field between the relatively widely spaced pairs of electrodes does not materially impede the displacement or flow induced by the relatively strong fields established between the closely spaced electrode pairs.

The experimental evidence now available strongly suggests that the cross field and particularly the cofield displacement are substantially increased by the provision of an electric field which is non-homogeneous; that is, a field which contains regions of high flux concentration and regions of relative low flux concentrations. Such non-homogeneous fields are produced by utilizing electrodes of relatively small size, or of irregular configuration, or electrodes presenting a plurality of sharp edges.

As indicated, the displacement phenomona is believed to occur whenever an electrical field is applied to a dielectric liquid under conditions which permit current leakage, but the readily visible conversion of energy occurs only under selected conditions. Therefore, this invention may be utilized for the production of dielectric transducers generally, i.e. wherever it is desirable to move a dielectric physically, regardless of whether the purposeful displacement of the dielectric is obvious on superficial inspection or whether it is minute.

While it is impossible to anticipate all of the practical uses to which our discovery may be put, the invention and its advantages are best explained by reference to several of the many possible transducers in which our conversion of energy principle is employed.

As a generality, our method lends itself to utilization in all circumstances in which it is useful or desirable to accomplish a limited degree of displaceemnt of a dielectric in relation to electrodes by means of direct electrical current of relatively high voltage but very low amperage. In other words, the amount of current consumed in the conversion of energy is very minute in comparison with the current consumed in most kinetic actions produced by electrical current, but on the other hand, the voltage is relatively high. The invention therefore recommends itself for use in electrical systems which employ vacuum tubes or in circuits in which the use of vacuum tubes is inherently feasible. The use of this invention obviates the necessity for heavy currents under all circumstances wherein the total amount of energy required for the desired physical displacement is not so great but that the voltage available is sufficiently high to satisfy the power requirement at very low amperage.

The possibilities and limitations of the conversion of energy principle of this invention may be better estimated from a more detailed description of the process. In the first place, the degree of displacement of the dielectric liquid depends upon the intensity of the electrical field between the electrodes, that is, on the potential gradient between them. If the potential gradient is increased by narrowing the gap between the electrodes or by raising the potential applied to the electrodes, a point is reached at which arcing or corona discharge takes place, the exact point depending upon the nature of the dielectric. Hence, for any given dielectric there is an upper limit to the potential gradient which may be employed.

As the potential gradient is decreased, the responsive displacement of the dielectric decreases non-linearly and apparently disappears altogether, although very minute and undetectable displacement may be theoretically possible. In other words, there is an upper limit to the amount of power which may be converted from electrical energy to kinetic energy by the principle of this invention, the exact amount depending upon the nature of the dielectric, the spacing of the electrodes and other factors, such as electrode configurations. It follows that our principle is not suitable for uses which require substantial power except where extremely large electrode surfaces are feasible; but rather is adapted for uses wherein it is desirable to effect mechanical movements, but to eliminate, insofar as possible, the presence of moving mechanical parts, and wherein promptness of action, reliability, and durability are required. Also as indicated, the responsiveness of the dielectric and the choice of a dielectric suitable for a specific use are factors to be considered in relation to practical applications of the principle.

The disclosure is made primarily in respect to liquid dielectrics. In general the dielectrics which may be displaced by the principle of our invention comprise crude and refined mineral oils, animal and vegetable oils, aldehydes, organic acids, esters, alcohols, ketones, coal tar derivatives, aromatics, silicones, etc., that is, organic substances generally which exhibit dielectric properties. A list of a substantial number of dielectrics which have been tested for responsivity appears at a later point herein.

In general, it is possible to obtain displacements of dielectric of a practical, useful magnitude by utilization of a potential gradient in the general range of 5000 to 25,000 volts per inch. Inasmuch as displacement increases as the potential difference of the electrodes becomes greater and decreases as the spacing of the electrodes becomes greater, the optimum electrode spacing and applied potential may vary with the requirements of any individual application. However, for purposes of disclosure herein, the transducers utilizing this invention have been selected which operate with electrode spacing of ¼ inch or less and under a potential in the range of 1000 to 4000 volts.

From the foregoing disclosure of the general principles of our invention and from the following detailed description of the drawings illustrating several preferred devices for utilizing the invention, those skilled in the art will readily comprehend many different applications to which the present invention may be put.

Figure 1:
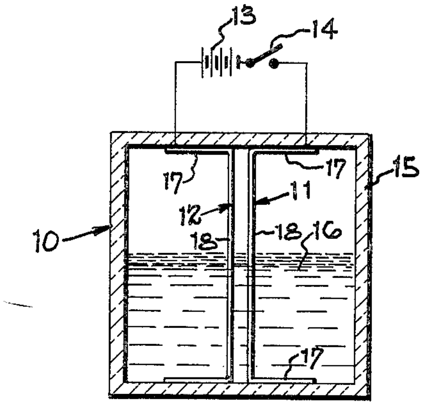
FIGURE 1 is a semi-diagrammatic cross-sectional view of a cell for effecting cross field displacement of a dielectric liquid, the electrode energizing circuit of the cell being open.

As shown in FIGURE 1, one form of apparatus for effecting cross-field displacement of a dielectric liquid includes a cell 10 having two electrodes 11 and 12 which are connected across a source of potential 13 and a switch 14. Electrodes 11 and 12 are mounted within housing 15 of the cell, the housing in the embodiment shown being of substantially rectangular cross-section and being formed of a suitable nonconductive material such as "Lucite" or glass. The adjacent walls of the housing 15 are joined together as by means of a suitable adhesive to form a fluid-tight chamber, enclosing electrodes 11 and 12 and a quantity of dielectric liquid 16.

Each of the electrodes 11 and 12 includes upper and lower flanges 17 seated against the upper and lower walls of the housing. Each of the electrodes also includes two vertical strips 18 extending between the upper and lower flanges. The strips of the electrodes are disposed in opposition with one another and are spaced apart a distance of the order of ¼ inch.

When no potential is applied to the cell electrodes the upper surface of the dielectric liquid lies in a horizontal plane as shown in FIGURE 1. However, when switch 14 is closed to apply a D.C. potential of the order of several thousand volts, for example, three or four thousand volts, to the electrodes, a nonhomogeneous electrostatic field is created between the electrodes, and a column of dielectric fluid will rise transverse to the field lines between the electrodes. In practice, the height to which the fluid rises varies from a small fraction of an inch to 1¾ inches, depending upon the potential applied, the electrode spacing and configuration, and the particular dielectric employed.

As suggested above, no completely reliable, theoretical criteria are available for predicting in advance which dielectric materials will rise appreciably between the electrodes when a potential is applied. However, in general it has been found that there is a correlation between the dielectric constant of a liquid and the magnitude of its rise, the rise increasing with increase in the dielectric constant. It has been experimentally determined that the following dielectrics and mixtures thereof will rise to varying degrees:

Acetone
Acetophenone
Adipol 2EH
A silicone
Benzaldehyde
Benzene
Bromobenzene
n-Butylamine
n-Butyl bromide
Butyl stearate
Carbon disulfide
Carbon tetrachloride
C & C Flexol H–26
C & C Flexol 8n8

Chlorobenzene
Chloroform
Cyclohexane
Dibutoxyethyl phthalate
Di-n-butylamine
Di-ethylamino-ethanol
Di-isobutylamine
Di-isopropylamine
Di-octyl sebacate
Dipropylamine
Dowanol No. 1
Dowanol 2B
Dowanol 3
Dowanol 5B
Ethanolamine
Ethyl iodide
Ethylene bromide
H. A. castor oil
n-Hexyl bromide
n-Hexyl iodide
Kerosene
Methyl ethyl ketone
Methyl iodide
Methyl isobutyl ketone
Methyl-n-propyl ketone
Mineral oil
Monoethanolamine
Nitrobenzene
n-Octyl decyl adipate
n-Propyl bromide
Ohio apex Kp 120
Ohiopex R9
Paraplex RG 8
P-cresyl acetate
Pyridine
Tertiary amyl alcohol
Toluene
Triethylene glycol di-2-ethyl benzoate
Triethylene glycol di-2-ethyl hexoate
Tri-2-ethyl hexyl phosphate
Water (conductivity i.e. very pure)

Of the above listed group of liquids, the following exhibit the largest rise: Acetone, benzene, tertiary amyl alcohol, chlorobenzene, and benzaldehyde.

Figure 4:
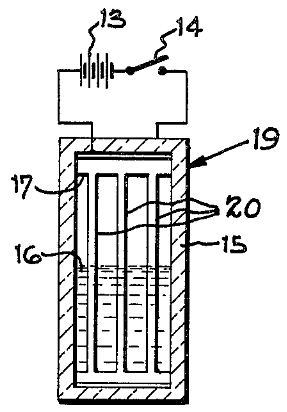
FIGURE 4 is a semi-diagrammatic cross-sectional view, similar to FIGURE 3, of a modified form of cell.

FIGURE 4 shows a modified cell 19, generally similar to that shown in FIGURE 1, for producing cross-field displacement of a dielectric liquid. The cell of FIGURE 4 is adapted to displace a larger quantity of liquid than the cell of FIGURE 1. The electrodes of cell 19 are provided with three vertical strips 20 instead of the two vertical strips provided in cell 10. This latter construction results from the empirical determination that when increasing the size of a cell, maximum displacement is obtained by increasing the number of electrode strips rather than by increasing the size of the individual electrode strips. Since a larger number of electrode strips produces an electrostatic field which is appreciably less homogeneous than would be the case where a smaller number of large planar electrodes are employed, it appears that the degree of nonhomogeneity of the field affects the amount of cross-field displacement of a dielectric liquid.

Figure 5:
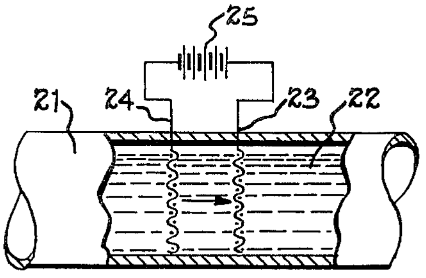
FIGURE 5 is a side elevational view, partially in section, of apparatus for effecting cofield flow of a dielectric liquid.

FIGURE 5 is a semi-diagrammatic view of apparatus for effecting cofield flow of a dielectric liquid. As shown in FIGURE 5, a tubular conduit 21 encloses dielectric liquid 22, a positive electrode 23, and a negative electrode 24. Each of the electrodes is of a perforated configuration to permit the flow of a liquid through the electrode. One satisfactory electrode construction comprises a circular wire screen mounted transversely within a conduit. The two electrodes 23 and 24 are connected across a source of high D.C. potential 25, the potential being substantially the same as that employed to obtain cross-field displacement in cells 10 and 19.

When a suitable dielectric is introduced into the conduit, between the electrodes, the dielectric liquid will flow under the influence of the electrostatic field produced by the electrodes. Many dielectrics flow from the negative electrode to the positive electrode as indicated by the arrow in FIGURE 5. However, other liquids such as acetone flow in the reverse direction from the positive electrode to the negative electrode. Many of the liquids listed above as being displaced in a cross-field direction, are also displaced, at least a small amount, in the cofield direction. Of the liquids which we have tested, the following six are displaced the greatest amount in the cofield direction in the presence of a given electrostatic field. Acetone, normal propyl bromide, chlorobenzene, bromobenzene, acetophenone, and methyl ethyl ketone.

Figures 6, 7, 8, 9, 10:
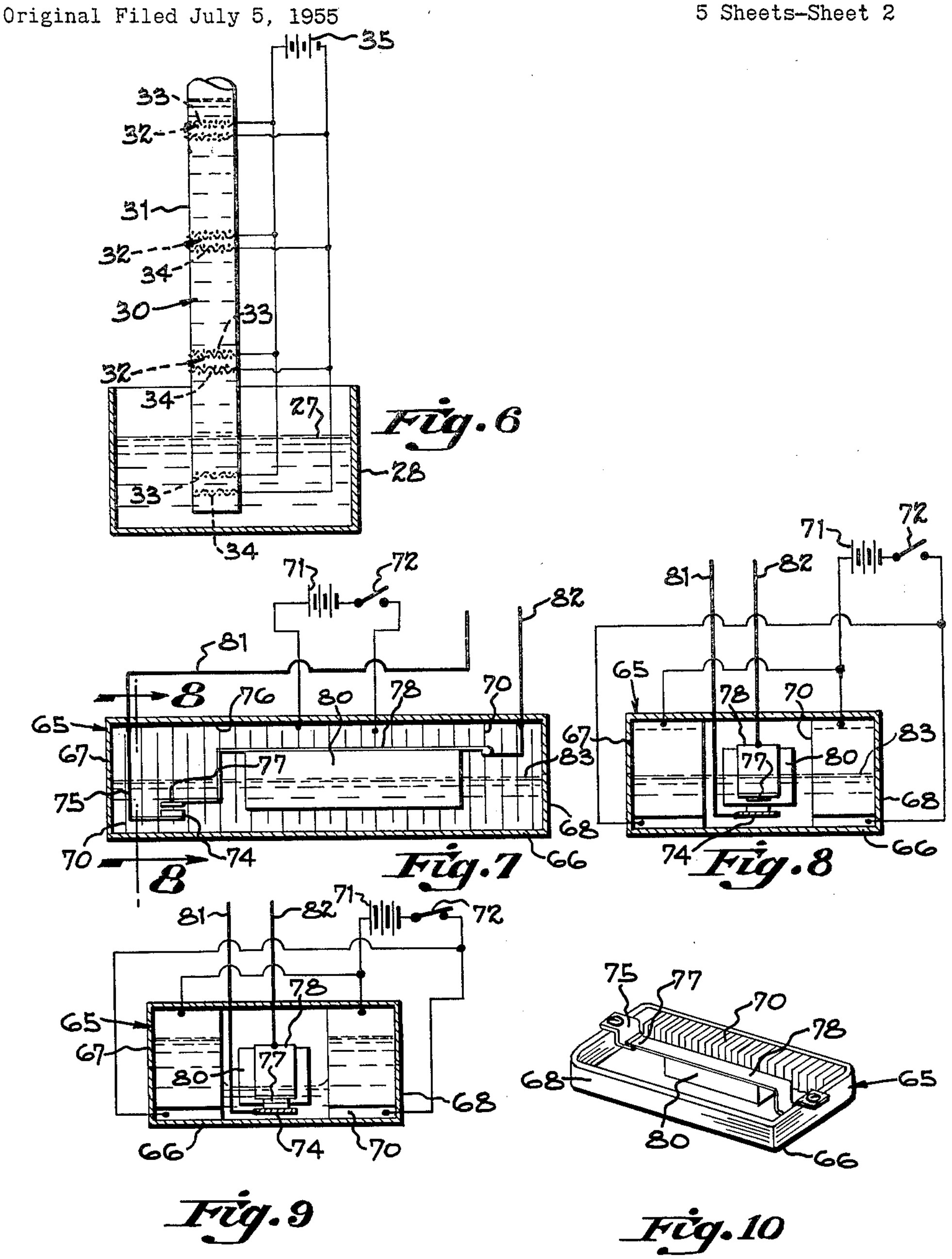
FIGURE 6 is a diagrammatic view of a pump constructed in accordance with the present invention.
FIGURE 7 is a longitudinal cross-sectional view of a relay utilizing the principles of the present invention.
FIGURE 8 is a cross-sectional view taken along line 8—8 of FIGURE 7 with the control and power circuits open.
FIGURE 9 is a view similar to FIGURE 8, showing the relay with the control and power circuits closed.
FIGURE 10 is a perspective view of the base assembly of the relay with one set of electrodes removed.

FIGURE 6, is a diagrammatic view of a pump, or liquid impeller, utilizing the principle of cofield flow.

As shown in FIGURE 6, a quantity of dielectric liquid 27 is contained in a reservoir 28; pump 30 communicates with the reservoir and is adapted to lift this liquid and to transport it to any desired location. As shown, pump 30 comprises a length of non-conductive tubing 31 formed of a suitable plastic or other material. Conduit 31 houses a plurality of electrode pairs 32, each electrode pair including a positive electrode 33 and a negative electrode 34.

Each of the electrodes is mounted within the conduit in a plane transverse to the axis of the tube and is of a perforate configuration adapted to permit the passage of fluid through the electrode structure. As shown in FIGURE 6, the electrodes are formed of wire screens; however, perforated plates, or lattices formed from wire or metal strips can also be employed. The electrodes of each pair are spaced a relatively small distance apart, for example, a quarter of an inch. The electrode pairs are in turn spaced from one another a substantially greater distance, for example, two inches. The exact spacing of the electrodes depends upon the magnitude of the potential applied to the electrodes, the nature of the dielectric being pumped and the type of flow desired. If the conduit is vertically positioned, the spacing between adjacent electrode pairs must be close enough to overcome the liquid head between each pair of electrodes.

For most liquids the electrodes are connected across a source of potential 35 in such a manner that the negative electrode is disposed adjacent to the inlet end of the tube and the positive electrode is disposed toward the delivery end of the tube. However, for acetone and similar liquids the electrode arrangement is reversed so that the negative electrode of each pair is positioned on the delivery side. Source 35 is effective to apply potential of the order of from 1000 to 4000 volts across the electrodes. This potential establishes a high field gradient between the electrodes of each pair and the dielectric liquid disposed in this field is urged in a cofield direction upwardly along the conduit of FIGURE 6. The displacement of the liquid between the electrodes of each pair causes movement of all of the liquid entrapped within the tube.

It will be appreciated that the facing electrodes of adjacent pairs establish an electrostaic field which tends to cause the dielectric liquid to flow in the opposite direction to the flow established by the electrodes of each pair. However, the relatively greater spacing between the electrodes of adjacent pairs reduces the field intensity to such a degree that the counter field is ineffective to appreciably impede the flow of liquid. The result is that a unidirectional flow of dielectric liquid is established in the conduit from reservoir 28 to the desired point of delivery.

There is no limit to the length of conduit 31 since even when it is disposed in a vertical plane each electrode pair is effective to more than support the liquid head above it. Should conduit 31 contain portions disposed in a horizontal plane the electrode spacing between adjacent pairs of electrodes can be substantially larger since in that event the electrodes need only overcome the dynamic friction head rather than a liquid head.

By equi-spacing the electrode pairs throughout the length of the conduit the pressure throughout the dielectric liquid is maintained substantially constant. In this respect, the present impeller differs greatly from a conventional pump in which a relatively high pressure head is created at the pump and then gradually dissipated between the pump and delivery point. However, if this latter arrangement is desired in a particular installation the electrode pairs can be concentrated in a relatively small length of pipe.

A pump, or impeller, of this type can be used to convey many dielectric liquids and has the advantage over other known pumps of avoiding the use of any mechanical moving parts. The flow is established entirely by the application of a high electrical potential to the electrode pairs establishing an electrostatic field in which a cofield flow occurs. Such an impeller may be used for conveying a radioactive dielectric liquid which might render the repair of a mechanical pump very inconvenient or expensive. The pump can also be used to convey a corrosive dielectric liquid which would tend to deteriorate a mechanical pump. The impeller may be further used advantageously in chemical plants for conveying dielectric fluids under conditions where regulated and reliable flow of a dielectric liquid is required, but constant supervision and regulation of a pump is inconvenient. Mechanical pumps, however expensive, are all subject to mechanical failure at unpredictable times, but the pump of this invention may be counted upon to operate with absolute reliability except for failure of the electrical power system.

Figure 11:
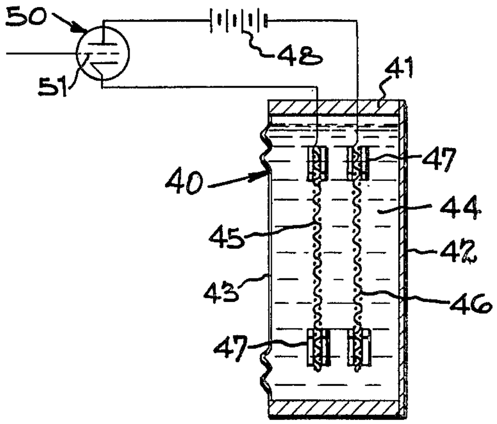
FIGURE 11 is a semi-diagrammatic cross-sectional view of a loud speaker constructed in accordance with the present invention.
Figure 12:
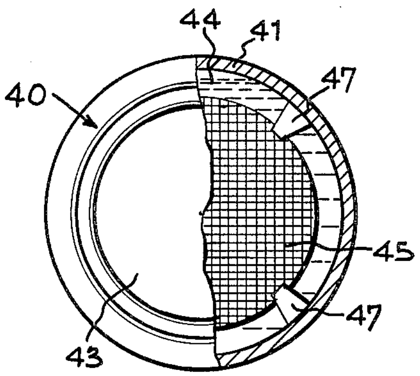
FIGURE 12 is an end view of the speaker shown in FIGURE 11, the diaphragm being partially broken away to show details of the electrode construction.

Another device, a speaker, for utilizing the cofield flow displacement phenomenon is illustrated in FIGURES 11 and 12. As there shown, speaker 40 includes a generally cylindrical housing 41 having a rigid back panel 42 and a flexible diaphragm 43 enclosing a dielectric liquid 44 within the housing. Housing 41 also contains two electrodes 45 and 46 formed of a wire screen material or the like. These electrodes are disposed transversely of the housing and are supported in any suitable manner such as by feet 47 formed of a non-conducting material such as Teflon. The electrodes are spaced relatively close together, for example, a quarter of an inch apart, and are substantially parallel with the face of diaphragm 43.

The electrodes are placed in series connection with a source of potential 48 and the anode cathode circuit of vacuum tube 50. Potential source 48 preferably provides a potential of the order of 1000 to 4000 volts. When vacuum tube 50 is conductive, a high potential, as applied across electrodes 45 and 46, and an electrostatic field is established between the electrodes causing the dielectric liquid disposed between them to flow from electrode 45 to electrode 46, through that electrode and then to impinge against the face of the diaphragm. From there the liquid travels radially outwardly and returns along the periphery of housing 41 to the area behind the rear screen.

By impressing a signal of audio frequency upon control grid 51 of tube 50 the conductivity of the tube and the potential applied across the electrodes is varied in a similar manner. The flow of liquid within the speaker varies in accordance with the voltage applied, causing a corresponding variation of pressure against the front diaphragm. This variation of pressure against the diaphragm results in vibration of the diaphragm; and this vibration is transmitted to the air in the usual manner.

A speaker of the type shown in FIGURES 11 and 12 has a relatively high impedance. For example, one 2½ inch speaker constructed in accordance with this disclosure had a D.C. impedance of two megohms. This high impedance permits the speaker to be driven directly by a high impedance potential source, such as a vacuum tube circuit without the use of an impedance matching transformer, of the type herefore required. The elimination of such an impedance matching transformer not only eliminates an element of substantial cost, but moreover since such transformers generally have undesirable frequency characteristics which distort the accuracy of sound reproduction, the elimination of such a transformer facilitates the provision of extremely high fidelity reproduction. This loud speaker may be used in radio sets, television sets, phonographs, recorders and similar equipment. The loud speaker itself is much simpler, and less expensive than a conventional loud speaker, and in addition is substantially more compact.

Figure 2:
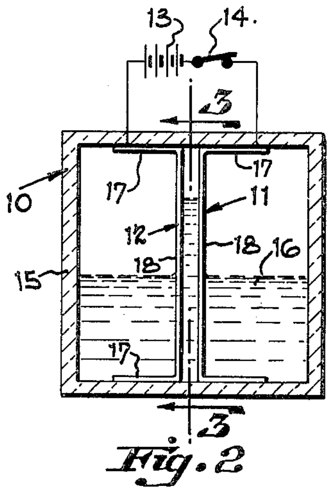
FIGURE 2 is a view similar to FIGURE 1, showing the cell with its electrode energizing circuit closed, resulting in a rise of a column of dielectric liquid between the electrodes.
Figure 3:
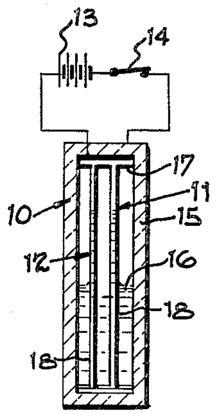
FIGURE 3 is a cross-sectional view taken along line 3—3 of FIGURE 2.
Figure 13:
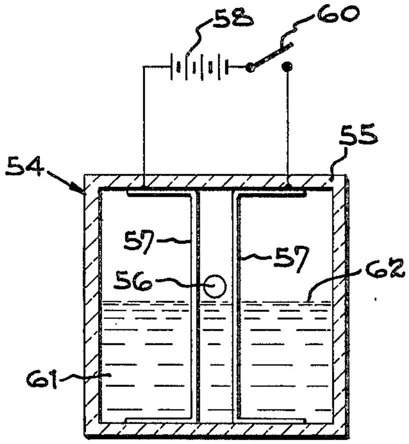
FIGURE 13 is a semi-diagrammatic cross-sectional view of a light valve embodying the principles of the present invention, the electrode energizing circuit being open.
Figure 14:
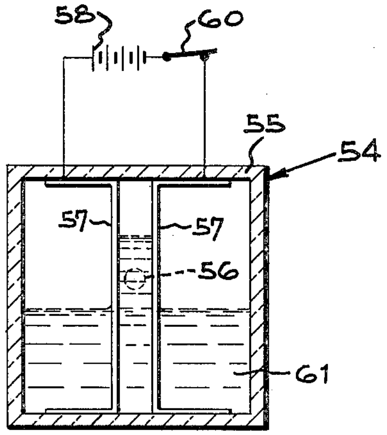
FIGURE 14 is a cross-sectional view similar to FIGURE 13, with the electrode energizing circuit closed.

A light valve, which utilizes cross-field displacement of a dielectric liquid is shown in FIGURES 13 and 14. As there shown, a light valve, or shutter 54, comprises a housing 55 which is preferably opaque except for a small aperture 56 formed in each of two opposite walls of the housing, the apertures being disposed in alignment with one another. Two electrodes 57, similar to those shown in FIGURES 1 to 3 are disposed so that the vertical electrode strips extend along each side of apertures 56. These electrodes are connected across a source of potential 58 and a switch 60. A dielectric liquid 61, such as acetone, is introduced into the housing in such an amount that the upper surface 62 of the dielectric liquid is disposed just below openings 56 when no potential is applied to the electrodes. If desired, a dye may be introduced in the dielectric to render it more opaque. However, this is not absolutely necessary since it has been discovered that a liquid which rises between the electrodes presents a corrugated liquid to air surface to the light beam, so that the light beam is effectively interrupted by light spreading even though the liquid may be clear and colorless. When switch 60 is opened the upper surface of the dielectric liquid remains just below the openings 56 so that the light may pass through the openings. However, when switch 60 is closed and a potential of the order of 1000 to 4000 volts is applied across the electrodes the dielectric liquid will rise between the electrodes as shown in FIGURE 14, to block the passage of light from one aperture 56 to the other aperture 56. The action of the shutter is relatively fast, being of the order of one-one hundredth of a second. The present light valve is extremely well adapted for such applications as electric organs, computers and the like, in which a beam of light is focused upon a photoelectric cell which in turn controls the flow of electric current in a secondary circuit.

The present light valve provides many advantages over light valves presently in use which include cumbersome solenoids, mechanical levers and the like. In the first place, the light valve may be made extremely small; furthermore, it has no moving mechanical parts so that it can be placed in locations where maintainence or repair of mechanical valves would be extremely difficult. Furthermore, the light valve is operated by a high voltage and draws an extremely small current so that several light valves can be connected in parallel and operated together or in sequence from the same voltage supply. A still further advantage is that the light valve is extremely economical to produce.

A relay utilizing the principle of cross-field displacement is shown in FIGURES 7 through 10. As there shown, relay 65 includes a casing 66 of generally rectangular cross section. In the preferred embodiment, casing 66 includes an upper section 67 and a lower section 68. The lower section supports a plurality of rectangular electrode plates 70. These plates are disposed in two longitudinal rows extending along the side walls of casing 66. The electrodes of each row are disposed in spaced parallel relationship to one another in planes transverse to the axis of the row. Upper casing member 67 supports a like plurality of electrodes which are also arranged in two longitudinal rows, the electrodes, within each row being mounted in spaced parallel relationship to one another in planes transverse to the axis of the row. The upper and lower sets of electrodes are adapted to be placed in interleaved relationship with one another when the upper and lower housing members are assembled. As best shown in FIGURE 7, the upper and lower sets of electrodes are respectively connected in parallel electrical relationship. The two sets of electrodes are connected across a source of potential, indicated at 71 and a switch 72. These latter elements constitute the control circuit of the relay.

The power circuit of the relay includes a stationary contact 74 which is mounted on the end of bracket 75 secured to the upper wall 76 of the casing. A movable contact 77 is disposed directly above stationary contact 74. The movable contact 77 is mounted on an arm 78 carried by floating block 80. Leads 81 and 82 are connected across contacts 74 and 77 and are adapted to provide electrical connection to a power source and load. A dielectric liquid 83, such as acetone, is inserted within the casing to a level sufficient so that float 80 is elevated to space contacts 74 and 77.

When the control circuit is opened so that no potential is applied to the electrodes, the upper surface of the dielectric liquid extends across the casing in a horizontal plane, as shown in FIGURES 7 and 8 and supports float 80 so that contact 77 is disposed a fraction of an inch above contact 74. However, when the control circuit is closed by the actuation of switch 72, the dielectric liquid rises between the electrode plates in the areas adjacent to the side walls of the housing. This causes the liquid in the central portion of the housing, between the two electrode rows to fall, as shown in FIGURE 9. When the level of the liquid in this portion falls, float 80 drops bringing contact 77 into engagement with contact 74 to complete the power circuit. In the preferred embodiment, the stationary contact 74 is disposed beneath the upper surface of the dielectric liquid so as to take advantage of the arc inhibiting properties of the dielectric liquid.

The present relay is adapted for use in computers and similar equipment; and is highly advantageous since, although it requires a high voltage it needs only a current of the order of a few milliamperes for its operation. Consequently, it can be operated directly by vacuum tube; in contrast with presently available relays which require a relatively large amount of current necessitating the provision of a circuit including a gaseous tube or other type of low impedance potential source.

Figure 18:
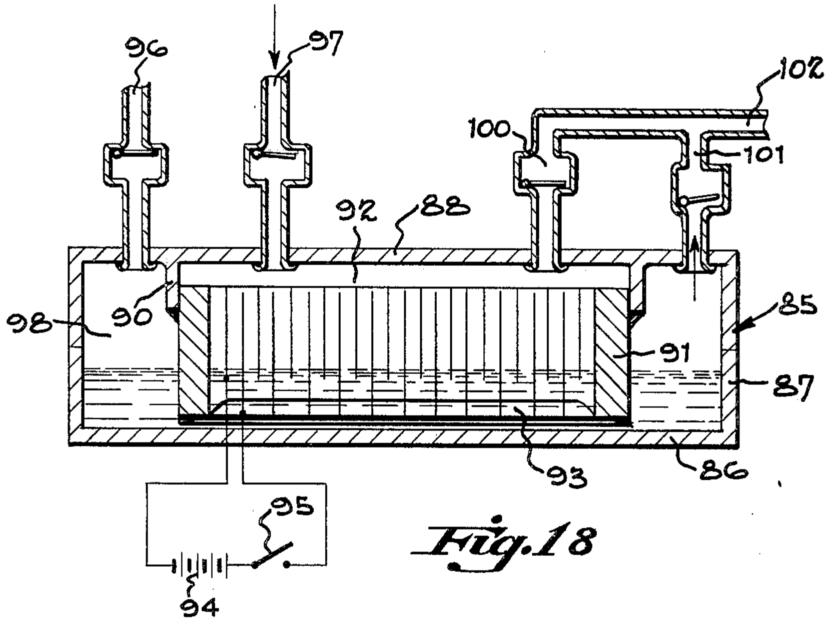
FIGURE 18 is a longitudinal cross-sectional view of a gas pump constructed in accordance with the present invention.
Figure 19:
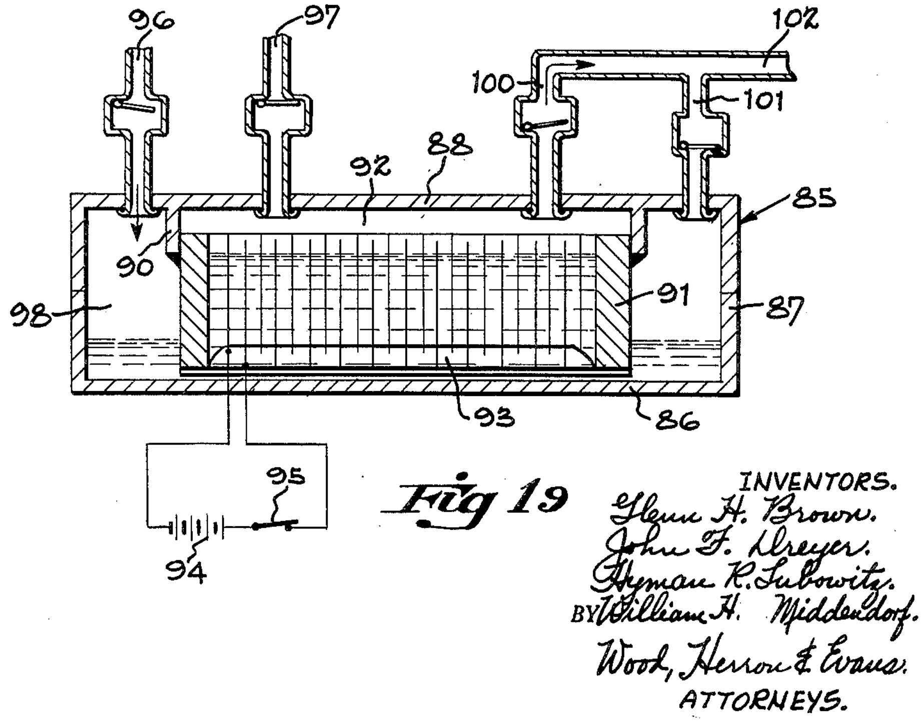
FIGURE 19 is a cross-sectional view similar to FIGURE 18, with the electrode energizing circuit closed.

Another device adapted to utilize the principle of cross-field displacement is the gas pump shown in FIGURE 18 and 19. As shown, gas pump 85 includes a housing 86, which in the preferred embodiment is of circular cross section, and includes a side wall 87 and top 88, the top being configurated to form a depending circular flange 90 extending into the interior of the housing. Flange 90 supports a circular inner wall 91, the flange and inner wall defining a central chamber 92 disposed within the inner wall, and an outer chamber disposed between the inner wall, and side wall. The housing also contains a dielectric liquid such as aceton which partially fills the casing. Inner wall 91 is provided with openings 93 to permit this dielectric liquid to flow between the central chamber to the outer annular chamber. At all times during the operation of the device, however, the dielectric liquid covers openings 93 so that a gas-tight seal is maintained between the inner chamber and outer chamber.

A plurality of spaced electrodes are disposed within the inner chamber, the electrodes being constituted by thin metallic plates disposed in parallel relationship with one another. Alternate electrodes are respectively connected together in parallel electrical relationship and the two sets of electrodes are connected across a source of potential 94 and a switch 95. When switch 95 is closed a potential of the order from 1000 to 4000 volts is applied across the two sets of parallel electrodes.

Two inlet gas connections 96 and 97 are provided, inlet 96 communicating with annular chamber 98 and inlet 97 opening into central chamber 92. Two outlet connections are provided, outlet 100 opening into central chamber 92 and outlet 101 opening into annular space 98. The two outlet conduits are joined to a discharge pipe 102. As shown diagrammatically, each of the inlet chambers is provided with a check valve adapted to permit gas to enter the pump and to prevent the gas from escaping from the pump. Similarly, outlet lines 100 and 101 are provided with check valves adapted to permit gas to leave the pump and to prevent gas from entering the pump.

When the pump is in operation and the electrode energizing circuit is opened, as shown in FIGURE 18, the surface of the dielectric liquid extends horizontally across the interior of the casing at the same level in both the inner and outer chambers. However, when the electrode energizing circuit is closed by closing switch 95, the dielectric liquid rises in the electrostatic field established between the electrodes in the inner chamber. The rise of liquid in the inner chamber forces gas which has previously entered the upper portion of that chamber through inlet 97, outwardly through outlet connections of 100. Simultaneously, the liquid in the outer annular chamber 98 falls so that gas is drawn into that chamber through inlet line 96. When switch 95 is again opened the liquid level in the central chamber falls, check valve in line 100 closes and check valve in line 96 opens so that gas is withdrawn into the central chamber. Simultaneously, the level of the liquid in the outer annular chamber 98 rises, the check valve in line 96 closes, the check valve in line 101 opens so that gas is forced outwardly through that line. During the operation of the pump switch 95 is opened and closed intermittently to alternately raise and lower the liquid in the central and annular chambers. It will be understood that the check valves in the inlet and outlet lines may be electrically responsive valves actuated in synchronism with switch 95 so that the pump may be operated at a pressure below that at which check valves could be operated by the gas pressure created by the pump.

The present pump is adapted for use in installations where gas is to be supplied at a relatively low pressure head and in which a mechanical pump is unsatisfactory; for example, because of the problem of adequate maintenance. The present pump has no moving mechanical parts which can be deteriorated or contaminated by gas. Moreover, the pump is provided with a perfect liquid seal between the inner and outer chambers so that leakage is eliminated and it is unnecessary to replace packing or other sealing elements after a period of use. One of the principal applications of this pump is the pumping of radioactive, poisonous, or corrosive gases at low pressures.

Figures 15, 16, 17, 20:
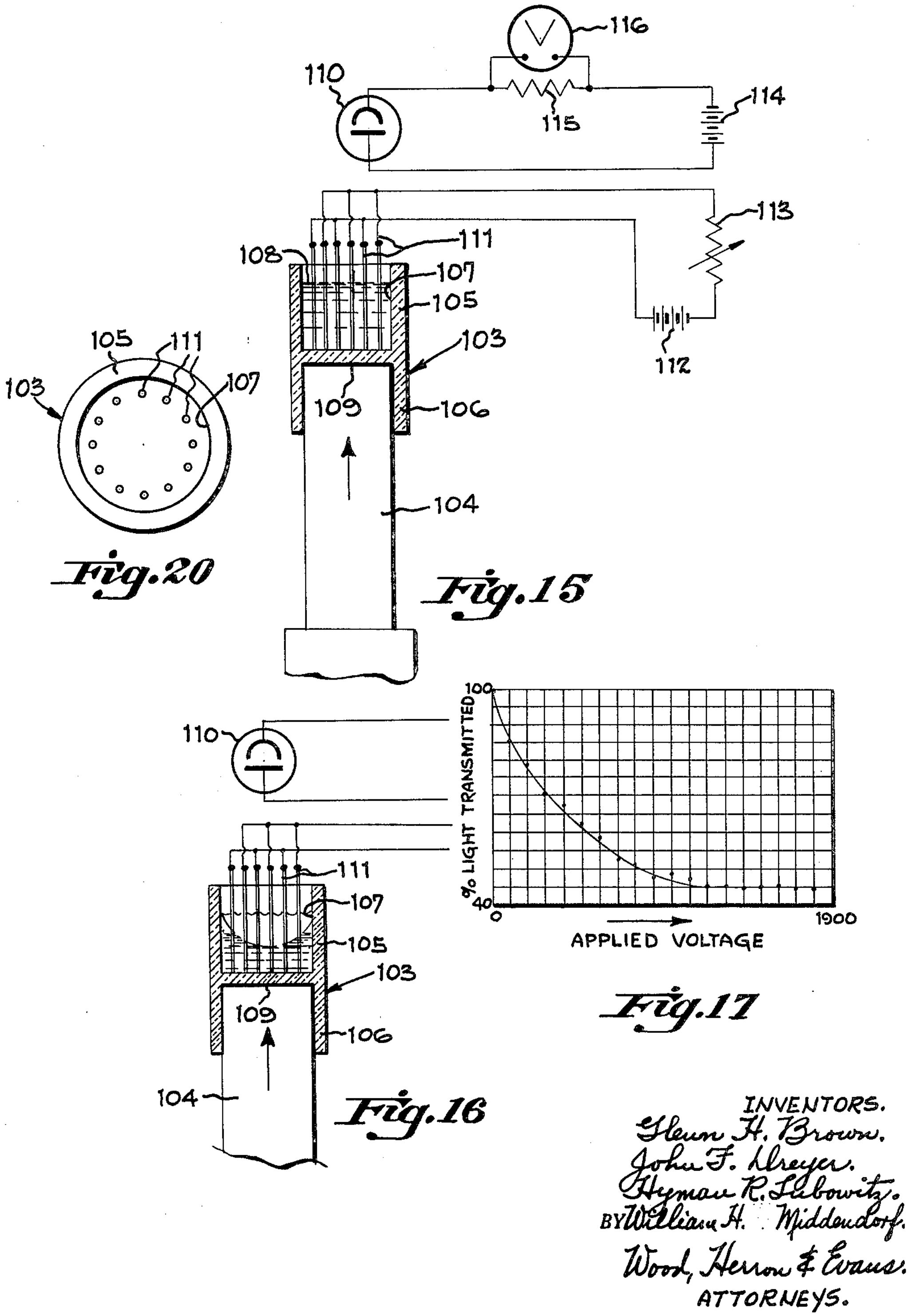
FIGURE 15 is a semi-diagrammatic view of a light attenuator constructed in accordance with the present invention.
FIGURE 16 is a view similar to FIGURE 15 with a relatively high potential applied across the electrodes of the attenuator.
FIGURE 17 is a graph showing the relationship between light attenuation and voltage applied to the attenuator electrodes.
FIGURE 20 is a top plan view of the light attenuator shown in FIGURE 15.

FIGURES 15 through 17 and 20 disclose a light attenuator, or lens 103, which utilizes the principle of cross-field displacement of a dielectric liquid. The apparatus shown in FIGURES 15 and 16 was employed to obtain the data plotted in FIGURE 17, showing the manner in which the optical properties of the lens are varied by changing the potential applied to the lens electrodes. As shown, attenuator 103 is placed over the end of a light collimating tube 104. Light is transmitted outwardly through the tube in substantially parallel lines from a light source not shown. Lens 103 includes a housing 105 having a skirt portion 106 adapted to embrace the end of the tube and a fluid chamber 107 filled with a dielectric liquid 108. Wall 109, forming the bottom of the fluid chamber, is transparent so that light passes from the collimating tube through wall 109 and into the dielectric. Light then passes through the dielectric and impinges upon photo cell 110.

A plurality of closely spaced electrodes 111 are mounted within the dielectric. The electrodes are preferably rods or thin metal strips, arranged in parallel relationship approximately ¼ inch apart. The rods or strips are spaced about the periphery of housing 105, as best shown in FIGURE 20. Alternate electrodes are connected in parallel relationship, the two sets of electrodes in turn being connected across a source of potential 112 and a variable resistance 113. These latter elements have been omitted from FIGURE 16. When no potential is applied to the electrodes the free surface of the dielectric liquid lies in a substantially horizontal plane transverse to the end of the collimating tube. However, as the potential applied to the electrodes is increased the peripheral portion of the liquid surface rises adjacent to the electrodes due to the cross-field displacement phenomenon and the meniscus of the dielectric liquid is altered, the meniscus becoming more concave as the electrode potential is increased.

The experimental installation shown, the changes of the liquid meniscus result in corresponding changes in current flowing through photo cell 110. The measuring circuit for determining these changes is a conventional one, including a source of potential 114 and load resistor 115 connected in series with the electrodes of the photo cell 110. A potential measuring device 116 is connected across the load resistor. A graph in FIGURE 17 shows how the light transmitted through the photo cell varies with the voltage applied to the lens electrodes as the voltage is varied from 0–1900 volts.

In practice, the lens of this invention can be used wherever it is desirable to provide a device for selectively attenuating a light beam in fine increments. The lens can also be advantageously used in conjunction with a telescope camera or the like, and the configuration of the dielectric continuously changed to keep an object in focus as the object approaches or recedes from the end of the instrument.

The above description of several different forms of apparatus adapted to utilize the phenomenon of cofield and cross-field displacement of a dielectric liquid are only exemplary; and those skilled in the art will readily comprehend various other forms of apparatus in which these phenomena can be employed. In general, transducers utilizing these phenomena can be used to advantage wherever it is desired to provide a compact electrical-mechanical transducer having no moving mechanical parts, or to operate a device from a high potential, low current source of power.

Having described our invention, we claim:

1. An impeller for an incompressible dielectric liquid, said impeller comprising a conduit filled with said dielectric liquid, two electrodes disposed in said conduit and immersed in said dielectric liquid, said electrodes being configurated in relation to said conduit so as not to block the flow of liquid in said conduit, and means for applying high-potential, direct current electrical energy to said electrodes, the potential gradient between said electrodes being of the order of several thousand volts per inch.

2. An impeller for an incompressible dielectric liquid, said impeller adapted to be operated by high-potential, direct current, electrical energy, and comprising a conduit filled with said dielectric liquid, two electrodes mounted in said conduit and immersed in said dielectric liquid, said electrodes being narrowly spaced longitudinally of the conduit, and means for applying an electrical potential having a gradient of several thousand volts per inch to said electrodes, whereby application of the electrical potential to the electrodes causes a flow of dielectric liquid in the conduit.

3. The impeller of claim 2 wherein the electrodes are planar and perforate to facilitate the flow of liquid through the conduit, and said electrodes are disposed with their faces perpendicular to the axis of the conduit.

4. A multi-stage pump for an incompressible dielectric liquid, said pump adapted to be operated by high-potential, direct current, electrical energy, said pump comprising a conduit filled with said dielectric liquid, a plurality of pairs of electrodes mounted in said conduit, the electrodes of each pair being immersed in said dielectric liquid and being narrowly spaced, the said pairs being spaced a distance greater than the distance the electrodes of each pair are spaced, and means connecting alternate electrodes so that each pair of electrodes consists of a positive electrode and a negative electrode, disposed in the same relationship to the direction of liquid flow, and means for applying a direct current potential across the electrodes of each pair so that a potential gradient of several thousand volts per inch is established between each pair of electrodes, whereby the electrical field created by the application of the electrical energy to the electrodes of each pair displaces dielectric liquid.

5. The pump of claim 4 wherein the electrodes are planar and perforate to facilitate the flow of liquid through the conduit, and said electrodes are disposed with their faces perpendicular to the axis of the conduit.

6. The method of establishing a flow of an incompressible dielectric liquid in a conduit which comprises mounting two planar faced electrodes in said conduit at right angles to the longitudinal axis of the conduit with the planar faces of the electrodes in parallelism, the flow impeding area of the electrodes being less than the cross-sectional area of the conduit, introducing a dielectric liquid into said conduit in contact with said electrodes, said dielectric liquid filling said conduit, and said electrodes being immersed in said dielectric liquid, and applying a direct current electrical potential to said electrodes, said electrical potential establishing a field gradient between said electrodes of the order of several thousand volts per inch.

7. The method of establishing a flow of an incompressible dielectric liquid in a conduit which comprises mounting two planar-faced electrodes in said conduit at right angles to the longitudinal axis of the conduit with the planar faces of the electrodes in parallelism, the flow-impeding area of the electrodes being less than the cross-sectional area of the conduit, introducing a dielectric liquid into said conduit in contact with said electrodes, said dielectric liquid filling said conduit, and said electrodes being immersed in said dielectric liquid, and applying a direct current electrical potential to said electrodes, the potential applied and the spacing of the electrodes being adapted to provide an electric field having a potential gradient of several thousand volts per inch which displaces the dielectric from the negative electrode toward the positive electrode without arcing or corona discharge.

8. A coaxial transducer comprising a conduit, a body of an incompressible dielectric liquid filling said conduit and two closely spaced electrodes disposed in said body of dielectric liquid, said electrodes having at least one opening therein to permit the coaxial flow of dielectric liquid when the electrodes are connected to a source of direct current, high-potential, electrical energy, and means for applying a direct current potential between said electrodes.

References Cited in the file of this patent

UNITED STATES PATENTS

| | | |
|---|---|---|
| 1,687,550 | Ehret | Oct. 16, 1928 |
| 1,980,521 | Hahn | Nov. 13, 1934 |
| 2,009,520 | Reisz | July 30, 1935 |
| 2,062,468 | Matz | Dec. 1, 1936 |
| 2,279,586 | Bennett | Apr. 14, 1942 |
| 2,295,152 | Bennett | Sept. 8, 1942 |
| 2,327,588 | Bennett | Aug. 24, 1943 |
| 2,595,616 | Toulon | May 6, 1952 |
| 2,600,129 | Richards | June 10, 1952 |
| 2,748,356 | Kaehni | May 29, 1956 |
| 2,765,975 | Lindenblad | Oct. 9, 1956 |
| 2,802,918 | Boyle | Aug. 13, 1957 |
| 2,851,618 | Krawinkel | Sept. 9, 1958 |
| 2,915,943 | Brown et al. | Dec. 8, 1959 |
| 2,945,443 | Auer et al. | July 19, 1960 |
| 2,992,406 | Sharbaugh et al. | July 11, 1961 |

FOREIGN PATENTS

| | | |
|---|---|---|
| 113,754 | Sweden | Apr. 10, 1945 |
| 262,829 | Great Britain | Feb. 16, 1928 |

OTHER REFERENCES

Traite de Physique, Par P. A. Daquin, 1867, pages 444 and 445.